Dec. 11, 1934.     J. W. MEIXELL     1,983,985

PLANT SUPPORT

Filed May 9, 1934

Inventor

John W. Meixell

By Wm. S. Hodges

Attorney

Patented Dec. 11, 1934

1,983,985

UNITED STATES PATENT OFFICE 1,983,985

PLANT SUPPORT

John W. Meixell, Lewisburg, Pa.

Application May 9, 1934, Serial No. 724,793

9 Claims. (Cl. 47—47)

This invention is a device for engaging and supporting growing plants, in such manner as to prevent undue spreading thereof, and to otherwise train them during growth.

One of the objects of the invention is to provide a ring-like support constructed and arranged to loosely encircle the stems or stalks of growing plants, in such manner as to prevent undue spreading thereof and to adequately sustain them from breaking while swaying from any cause. Another object is to provide a device of the character mentioned having simple and efficient means capable of frictionally engaging a supporting stake, in such manner that the loop-like support may be maintained in any adjusted position along the stake, so that the height of the support with respect to the ground may be adjusted at will. A further object is to provide a ring-like plant engaging device and supporting means therefor, so constructed and arranged that the parts presented to contact with the plants are smooth, and free of openings with which the plant growth may become entangled.

The invention will be hereinafter fully set forth and particularly pointed out in the claims.

In the accompanying drawing:—

Figure 1 is a top plan view of a plant support constructed in accordance with the invention. Figure 2 is a detail elevation of the stake and friction member as viewed from the front, the ring-like support being broken away. Figure 3 is a similar view taken from the back of the stake. Figure 4 is a perspective view illustrating the friction member and Figure 5 is a transverse sectional view on the line 5—5, Figure 1.

Referring to the drawing, 10 designates a supporting shaft or stake which may be of any desired length and any desired cross-sectional contour. For purposes of illustration, the stake is shown as constructed of angle iron with its lower end provided with a point 11, whereby it may readily penetrate the ground. As shown, the wings of the angle bar project forwardly. If desired, the corner of the angle bar 10 may be provided with notches 12, as indicated in dotted lines Figure 2, but ordinarily these notches are not necessary.

The friction support member S is illustrated as consisting of sheet metal formed with two angularly disposed arms 13, arranged at a proper angle to conform to the cross-sectional contour of the bar 10, and provided with forwardly projected ends 14, 14$^a$. Depending from the ends 14, 14$^a$ are members 16, which are wider at their lower ends than at their upper ends, so as to provide inclined overlapping edges 17 extending laterally across the edges of the stake or bar 10. The depending members 16 are provided with rearwardly extended flanges 18$^a$, 18$^a$, which are of approximately the same width as the ends of 14, the lower edges of the overlapping portion 17 being turned backwardly and slightly concaved to provide lips 19, positioned to engage the adjacent edges of the stake or support bar 10. It will be noted that the inner edges of the arms 13 are cut away as indicated at 15, so that the friction support S has a three point engagement with the back and sides of the bar 10, as indicated at $a$, $b$ and $c$ respectively. It will be observed that the contact points $b$ and $c$ are in a lower horizontal plane than the contact point $a$, and that they are so relatively arranged in their vertical planes that the member S will loosely engage the stake 10, in such manner that while said member S is in true axial alinement with the stake, it will be free for longitudinal slidable movement thereon, but upon being slightly canted with respect to the stake, it will be frictionally held against such longitudinal movement. The ends 14, 14$^a$ are provided with openings 20, 20$^a$, which register with similarly positioned openings 21, 21$^a$ in the respective flanges 18. The opening 21$^a$ is elongated, as shown. In practice for average use, it is preferred to make the depending portions 16 about one-half inch in length, but this invention is not limited to this measurement.

The plant engaging member P is preferably formed of a metal rod 25, of approximately ring-like form, having downturned ends 26, 26$^a$ arranged parallel with each other, and in spaced relation in such manner that they may be extended into the respective sets of openings 20, 21 and 20$^a$, 21$^a$. The end 26$^a$ has its lower extremity provided with an elongated shoulder portion 27, which is complemental to the elongated opening 21$^a$, so arranged that while the member P is in operative position, it may not become accidentally disengaged.

In practice, the plant-engaging member P is engaged with the frictional support member, by first passing the end 26$^a$ through the openings 20$^a$ and 21$^a$, respectively, and then rotating it with respect to the friction support member S, to such an angle that the shoulder 27 is locked against the underside of the flange 17$^a$. The other end 26 of the rod is then passed through the registering openings 20 and 21, thereby holding the plant-engaging member P and the friction member S in assembled relation.

When it is desired to utilize the device, the stake 10 is driven into the ground, and the friction member S is then engaged therewith, in the manner shown in the drawing. In this engagement the three points a, b and c are in contact with the stake, with the flanges 19 extending laterally over the front of the stake. It will be observed that by slightly raising the overhanging portion of the ring directly in front of the stake 10, the friction member S is brought into true axial alinement with the stake and freed so that it will slide up or down as may be desired, but that upon releasing the lifted portion of the ring, the weight thereof will cant the member S in such manner as to bring the flanges 19 into frictional engagement with the front edges of the stake. This last mentioned engagement, together with the three point engagement at the rear indicated at a, b and c respectively, will establish a frictional weight sustaining engagement between the support member and the stake, which will firmly support the member P in the adjusted position. Obviously, any number of members P may be supported on the same stake at different elevations, and ring members P of different diameters may also be employed.

The advantages of the invention will be readily understood by those skilled in the art to which it belongs. For instance, it will be observed that a very simple form of loop-like support for plants is provided, which may be readily adjusted to any desired elevation with respect to the ground. By employing the three point contact hereinbefore described, a strong frictional engagement is established between the support member and the stake by the weight of the ring member, so that the plant-engaging member is firmly held in any adjusted position without danger of slipping or becoming displaced. Nevertheless, whenever desired, the parts may be readily adjusted to any desired height and with no difficulty whatever, by first lifting member P. A further advantage is that there are no parts presented to the growing plants in such manner as to provide openings with which the plant growth may become entangled.

Having thus explained the nature of the invention and described an operative manner of constructing and using the same, although without attempting to set forth all of the forms in which it may be made, or all of the forms of its use, what is claimed is:—

1. A plant supporting device comprising a stake, a support member having portions engageable with the stake, said engageable portions being so separated and so constructed and arranged that while the support member is in axial alinement with the stake it will be free for longitudinal slidable movement thereon, but upon being slightly canted with respect to the stake it will be frictionally held against such longitudinal movement, and a ring-like plant-engaging member provided with free ends removably engaging said support member, said ring-like member being extended in front of the stake in such manner that its weight normally cants the support member sufficiently to establish a frictional weight-sustaining engagement between the support member and the stake.

2. A plant supporting device comprising a stake, a support member having portions engageable with the stake, said engageable portions being so separated and so constructed and arranged that while the support member is in axial alinement with the stake it will be free for longitudinal slidable movement thereon, but upon being slightly canted with respect to the stake it will be frictionally held against such longitudinal movement, and a rod-like plant engaging member bent into approximately ring-like form and having depending parallel free ends removably engaging the support member, said plant-engaging member being extended from the stake in such manner that its weight normally cants the support member sufficiently to establish a frictional weight-sustaining engagement between the support member and the stake.

3. A plant supporting device consisting of a stake, a support member having arms straddling said stake, said arms also having depending members engaging said stake, whereby a slidable engagement is provided, and a ring-like plant-engaging member provided with free ends removably engaging said support member and extended forwardly from the stake in such manner that its weight normally cants the support member sufficiently to establish a frictional weight-sustaining engagement between the support member and the stake.

4. A plant supporting device comprising a stake, a support member having arms straddling said stake, said arms also having depending members engaging said stake, whereby a slidable engagement is provided, a ring-like plant-engaging member provided with free ends removably engaging said support member and extended forwardly from the stake in such manner that its weight normally cants the support member sufficient to establish a frictional weight sustaining engagement between the support member and the stake, and means for normally preventing accidental separation of the support member and of the plant-engaging member.

5. A plant supporting device comprising a stake of angle iron structure, a support member provided with angularly disposed arms complemental to said stake and having a three point engagement therewith, said support member also having forwardly located depending members provided with portions laterally overlapping said stake, and a ring-like plant-engaging member provided with free ends removably engaging said support member, said plant-engaging member being disposed in front of the stake in such manner that its weight normally cants the support member sufficiently to establish a frictional weight-sustaining engagement between the support member and the stake.

6. A plant supporting device comprising a stake of angle iron structure, a support member provided with angularly disposed arms complemental to said stake and having a three-point engagement therewith, said support member also having forwardly located depending members wider at their lower ends than at their tops to provide portions laterally overlapping said stake, and a ring-like plant-engaging member provided with free ends removably engaging said support member, said plant-engaging member being disposed in front of the stake in such manner that its weight normally cants the support member sufficiently to establish a frictional weight-sustaining engagement between the support member and the stake.

7. A plant supporting device comprising a stake of angle iron structure, a support member provided with angularly disposed arms complemental to said stake and having a three-point engagement therewith, said support member also having forwardly located depending members wider at their lower ends than at their tops to provide portions laterally overlapping said stake, said depending members also having rearwardly extended lips, said arms and said lips having registering openings therein, and a ring-like plant-engaging member provided with parallel offset ends removably engaging the said openings, said ring-like member being disposed in front of the stake in such manner that its weight normally cants the support member sufficiently to establish a frictional weight-sustaining engagement between the support member and the stake.

8. A plant supporting device comprising a stake, a support member provided with angularly disposed arms having a three-point engagement with said stake, said arms having depending members provided with laterally extended flanges positioned to overlap said stake and provided at their lower edges with inturned lips positioned to engage said stake, said depending members being provided with rearwardly extended flanges, and a ring-like plant-engaging member having its ends removably engaging the arms and flanges of the support member and so disposed in front of the stake that its weight normally cants the support member sufficiently to establish a frictional weight-sustaining engagement between the support member and the stake.

9. A plant supporting device comprising a stake, a support member having a three-point engagement with said stake and provided with flanges overlapping said stake, said support member having pairs of registering openings therein, one of said openings being elongated, and a ring-like plant-engaging member provided with free ends removably engaging the respective pairs of openings in said support member, one of the ends of said plant-engaging member having a shoulder positioned to extend across the elongated hole while the parts are in operative position, the ring-like member being so disposed with respect to the stake that its weight normally cants the support member sufficiently to establish a frictional weight-sustaining engagement between the support member and the stake.

JOHN W. MEIXELL.